United States Patent
Chen et al.

(10) Patent No.: US 7,991,801 B2
(45) Date of Patent: Aug. 2, 2011

(54) REAL-TIME DYNAMIC AND SYNCHRONIZED CAPTIONING SYSTEM AND METHOD FOR USE IN THE STREAMING OF MULTIMEDIA DATA

(75) Inventors: Danny Yen-Fu Chen, Austin, TX (US); Troy Frank Burkman, Cedar Park, TX (US); Jesse Tijnagel, Namur (BE); David Charles Howard-Jones, Ittre (BE); Brian R. Heasman, Oostduinkerke (BE)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 12/136,594

(22) Filed: Jun. 10, 2008

(65) Prior Publication Data

US 2009/0307267 A1    Dec. 10, 2009

(51) Int. Cl.
*G06F 17/30* (2006.01)
(52) U.S. Cl. ........................................ 707/803; 348/468
(58) Field of Classification Search ............... 707/802, 707/999.107
See application file for complete search history.

(56) References Cited

U.S. PATENT DOCUMENTS

| | | | | |
|---|---|---|---|---|
| 5,539,920 A | | 7/1996 | Menand et al. | 455/5.1 |
| 5,563,648 A | | 10/1996 | Menand et al. | 348/13 |
| 6,792,615 B1 | | 9/2004 | Rowe et al. | 725/37 |
| 6,816,468 B1 | | 11/2004 | Cruickshank | 370/260 |
| 7,548,565 B2 | * | 6/2009 | Sull et al. | 370/503 |
| 7,617,272 B2 | * | 11/2009 | Bulson et al. | 709/203 |
| 7,765,574 B1 | * | 7/2010 | Maybury et al. | 725/105 |
| 7,793,205 B2 | * | 9/2010 | Errico et al. | 715/201 |
| 7,844,684 B2 | * | 11/2010 | Pettinato | 709/217 |
| 2005/0210511 A1 | | 9/2005 | Pettinato | 725/61 |
| 2005/0271269 A1 | * | 12/2005 | Errico et al. | 382/164 |
| 2005/0283752 A1 | * | 12/2005 | Fruchter et al. | 717/100 |
| 2008/0284910 A1 | * | 11/2008 | Erskine et al. | 348/468 |

OTHER PUBLICATIONS

Caption First; http://www.captionfirst.com, printed Mar. 19, 2008.
HiSoftware Captionaing Services—Web based (pre-recorded) Programs and Streaming Media Services; http://www.hisoftware.com/services/cc_services.htm, printed Mar. 19, 2008.
Videoconference Captioning; http://www.ncicap.org/vidcaps.asp, printed Mar. 19, 2008.
StrearnText.Net; http://streamtext.net/default.aspx, printed date Mar. 19, 2008.
TextStreaming.com; http://www.textstreaming.com/, printed Mar. 19, 2008.

* cited by examiner

*Primary Examiner* — Debbie Le
(74) *Attorney, Agent, or Firm* — Melissa Asfahani; Kermit D. Lopez; Luis M. Ortiz

(57) ABSTRACT

A dynamic and synchronized real-time captioning system and method for streaming media. A streaming encoder module can provide a code injection to marry textual data and audio/video (AV) data in order to form a text and/or audio stream. A streaming control module can allow an end-user to specify font format utilized to embed into an AV stream. A delay enhancement tool can be adapted to adjust speed of the text and/or audio stream, which allows the end-user to receive the text and/or audio stream at a proper speed. A customized graphical user interface (CGUI) can be adapted to assist with streaming administration to provide an encoding option, caption source location, delay control and slide control. Therefore, the captioning system can be able to synchronize and deliver the textual data and the AV data for live media streaming at an end-user's system.

8 Claims, 7 Drawing Sheets

REAL-TIME DYNAMIC AND SYNCHRONIZED CAPTIONING SYSTEM AND METHOD FOR USE IN THE STREAMING OF MULTIMEDIA DATA

TECHNICAL FIELD

Embodiments are generally related to data-processing systems and methods. Embodiments also relate in general to the field of computers and similar technologies, and in particular to software utilized in this field. Embodiments are additionally related to real-time captioning systems and streaming audio/video media.

BACKGROUND OF THE INVENTION

With the advent of the Internet large bandwidth availability, streaming media has become a very common technique for the delivery of media. The delivery of streaming media includes for example, webcasting, the display of video data, and various on-line television and sports broadcasting. Such audio/video (AV) streaming is much more convenient than traditional media delivery methods and also offers flexibility to end-users, which assists providers and multimedia companies in significantly reducing overall delivery costs.

Real time streaming protocol (RTSP) can be utilized to control the streaming of media data. RTSP technology utilizes a packet of information for the delivery of media streams to the end-user. RTSP also facilitates remote control access and allows time-based file access to a streaming server by buffering the packaged data to media players. Streamed media can be additionally configured with real-time captioning (RTC), which converts spoken language (e.g., English, Spanish, etc) from the streaming media to a readable format (e.g., somewhat similar to a court stenography process).

Real-time captioning is a method of captioning in which captions are simultaneously prepared and transmitted at the time of origination by specially trained real-time captioners utilizing a stenotype machine. The stenotype machine can be connected to a computer associated with software that translates stenographic shorthand into words in caption formats and standard spellings. RTC also facilitates communication for a person who prefers reading rather than listening by capturing the audio portion into a text log and maintains the history, and makes the media accessible to aid people with hearing disabilities.

Similarly, RTC can be widely utilized on television and classrooms environments, and has gained tremendous popularity with respect to streaming media. RTC also has the capability of providing real-time captions over web-based multimedia; however it is very difficult to deliver real-time multimedia with proper synchronization. Caption delivery systems can also be utilized to provide captions for non-web-based technologies such as radio, television, video conferencing, etc, which ensures accessibility to all forms of live, real-time multimedia.

The majority of existing captioning systems utilize some form of a writer's transcript for displaying text on a screen for a user. Currently, the text from the writer's transcript is not capable of being properly synchronized with the AV data, so current captioning systems have been explored, which utilize simple makeup language (SML) files or standard text files to display captions on a line-by-line basis. Such approaches are known as "back-end" replays, which do not combine text captioning in the media streaming process. Hence, current captioning systems do not possess capabilities to support real-time AV and text streaming over web-based multimedia networks. Although, many popular text-streaming techniques can be implemented in pure HTML, however, they do not deliver the textual data with the media streaming data. Moreover, alternative methods are also available for streaming the AV data and the textual data, but these techniques utilize two different time intervals for performing video/audio and text streaming.

Based on the foregoing it is believed that a need exists for an improved software application or service, which allows AV data streaming to be synchronized with text streaming to thereby provide live captioning, as disclosed in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for an improved dynamic and synchronized captioning system and method for the streaming of audio/video media in the context of a computer network.

The aforementioned aspects and other objectives and advantages can now be achieved as described herein. An improved dynamic and synchronized real-time captioning system and method for streaming media is disclosed. A streaming encoder module can provide a code injection to marry textual data and audio/video (AV) data in order to form a text and/or audio stream. Additionally, a streaming control module can be utilized to allow an end-user to specify font formats that can be embedded into an AV stream. A delay enhancement tool can also be utilized to adjust the speed of the text and/or audio stream, which allows the end-user to receive the text and/or audio stream at a proper speed. A customized graphical user interface (CGUI) can be adapted to assist with streaming by providing an administrator and/or other user with various administrative and control options, such as, for example, an encoding option, a caption source location, a delay control option and a slide control option. Such an approach permits the synchronization and delivery of textual data and AV data for live media streaming via an end-user system.

The disclosed captioning approach can also include the use of a captioning service text analyzer that allows an administrator to configure a pattern or delimiter to separate words for display. The captioning service text analyzer can "intelligently" determine, for example, ending words to be included in the display of the captioned text. The captioning system further can utilize a text streaming service by entering a uniform resource locator (URL) with the assistance of a customized GUI in order to transcribe the AV data into a textual data to deliver the text and/or audio stream in the context of a resulting multimedia data stream. The captioning approach described herein can facilitate profile building for each provider and customer to allow a customized live captioned multimedia streaming solution.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
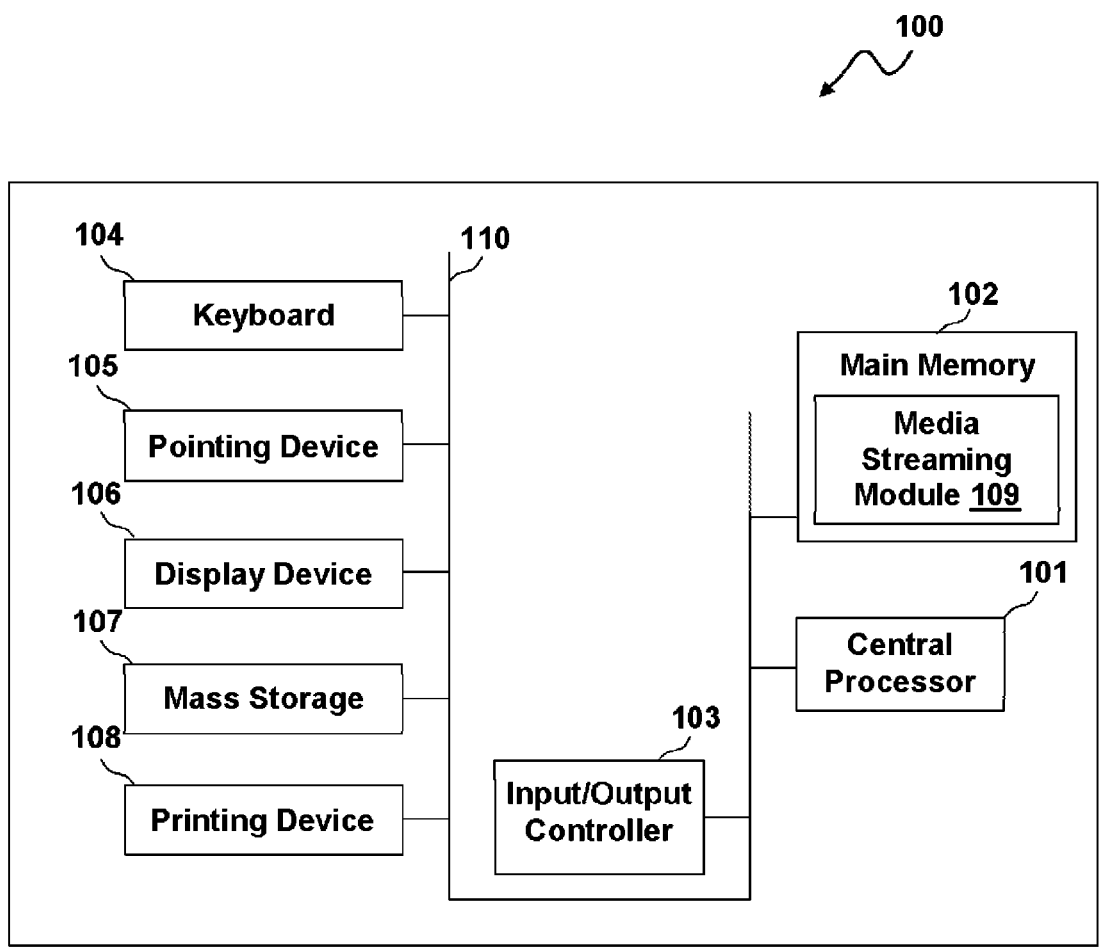
FIG. 1 illustrates a schematic view of a computer system in which the present invention may be embodied.
Figure 2:
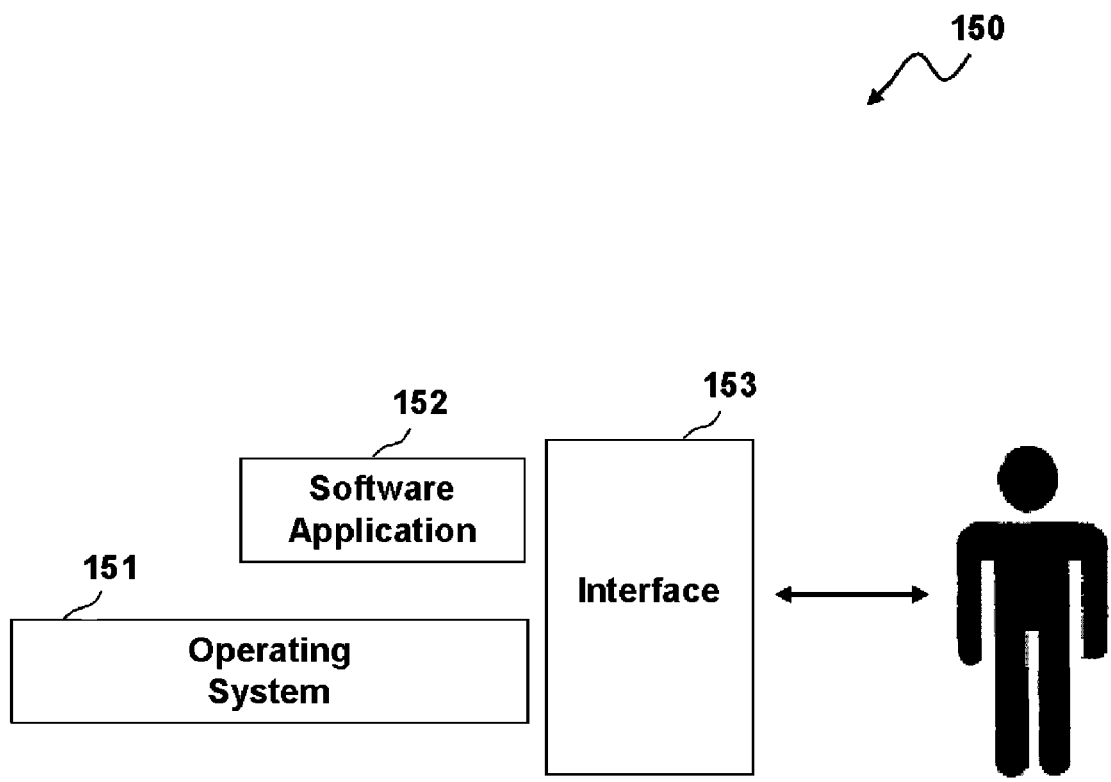
FIG. 2 illustrates a schematic view of a software system including an operating system, application software, and a user interface for carrying out the present invention.
Figure 3:
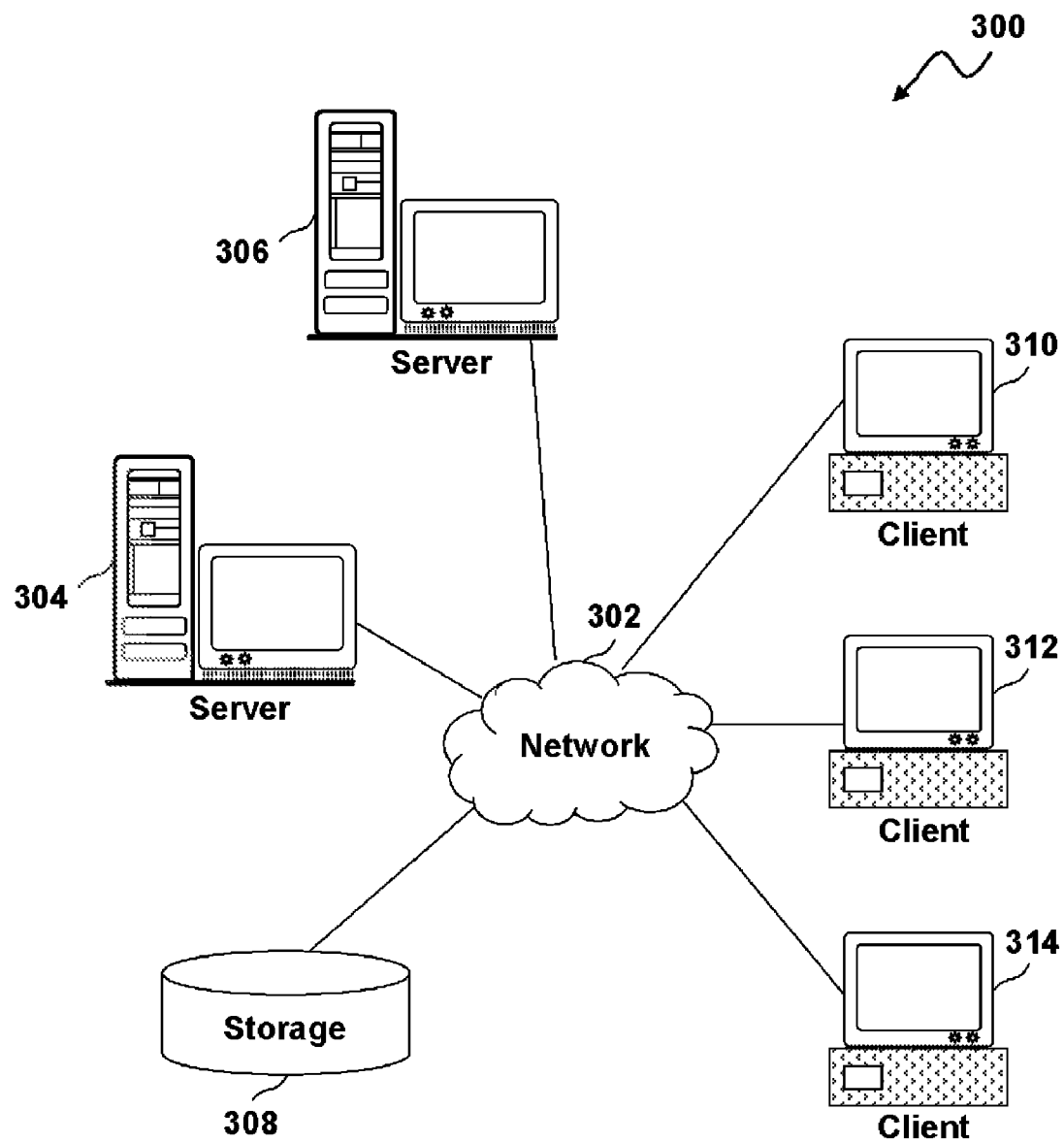
FIG. 3 depicts a graphical representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

Figure 4:
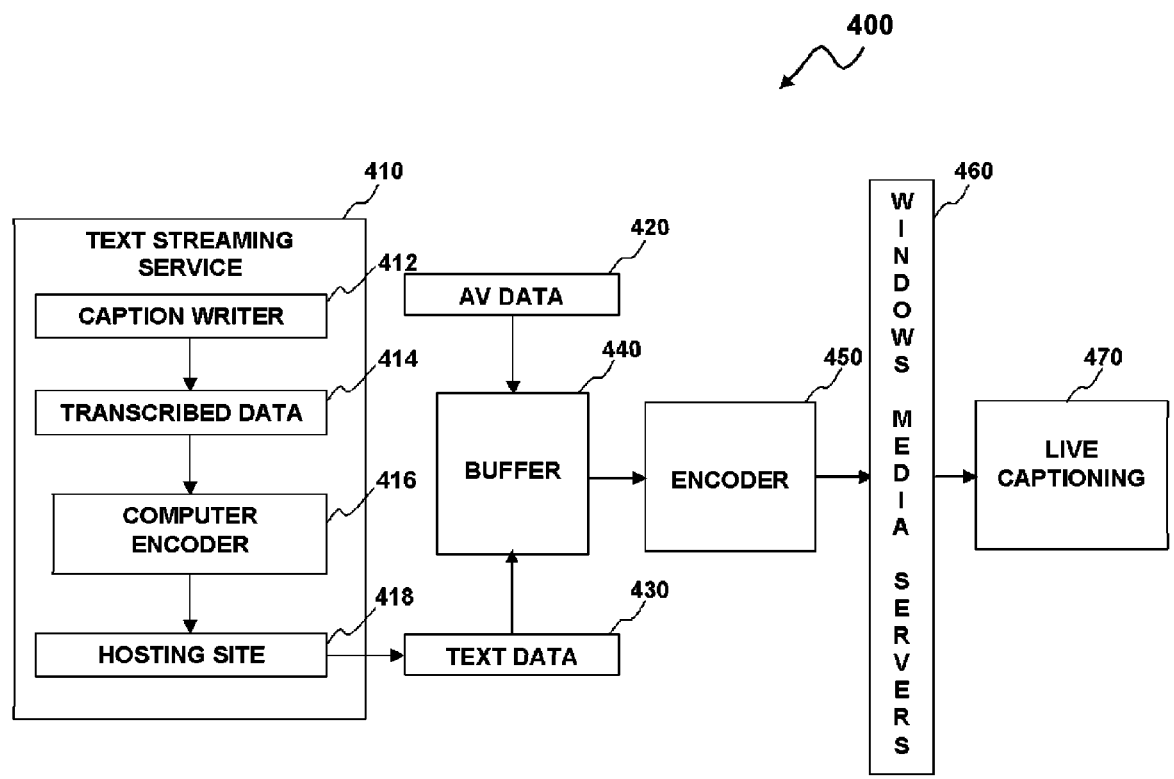
FIG. 4 illustrates an exemplary block diagram of a synchronized captioning system for streaming media, in accordance with a preferred embodiment.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing apparatus 100 as desired. As illustrated, the various components of the data-processing apparatus 100 communicate through a system bus 110 or similar architecture. The main memory 102 also can include a media streaming software module 109, which can be utilized to synchronize AV data streaming with textual data streaming in order to provide live captioning 470, as illustrated in FIG. 4. Such media streaming software module 109 is generally accessible by the central processor 101 and can be run/processed via such a processor.

Note that as utilized herein, the term "AV data" or "audio/visual data" can be utilized interchangeably with the term "multimedia data" which generally includes data such as audio data, video data, and so forth. Additionally note that as utilized herein the term "module" generally refers to a software module or a group of such software modules. A module in this regard can be thought of as a collection of routines and data structures that performs a particular task or implements a particular abstract data type. Such modules may be composed of two basic parts: an interface, which lists the constants, data types, variables, and routines that can be accessed by other modules or routines, and an implementation, which may be private (i.e., accessible only to the module) and which contains the source code that actually implements the routines in the module. Thus, for example, the media streaming software module 108 may include a variety of other types of modules, such as, for example, a streaming encode module, a delay enforcement module, and/or a delay enhancement tool, all of which are discussed in greater detail herein.

FIG. 2 illustrates a computer software system 150 that can be provided for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing apparatus 100. The application software 152 can be a media streaming software for live captioning 470, as illustrated in FIG. 4. The data-processing apparatus 100 receives user commands and data through user interface 153; these inputs may then be acted upon by the data-processing apparatus 100 in accordance with instructions from operating module 151 and/or application module 152.

Figure 5:
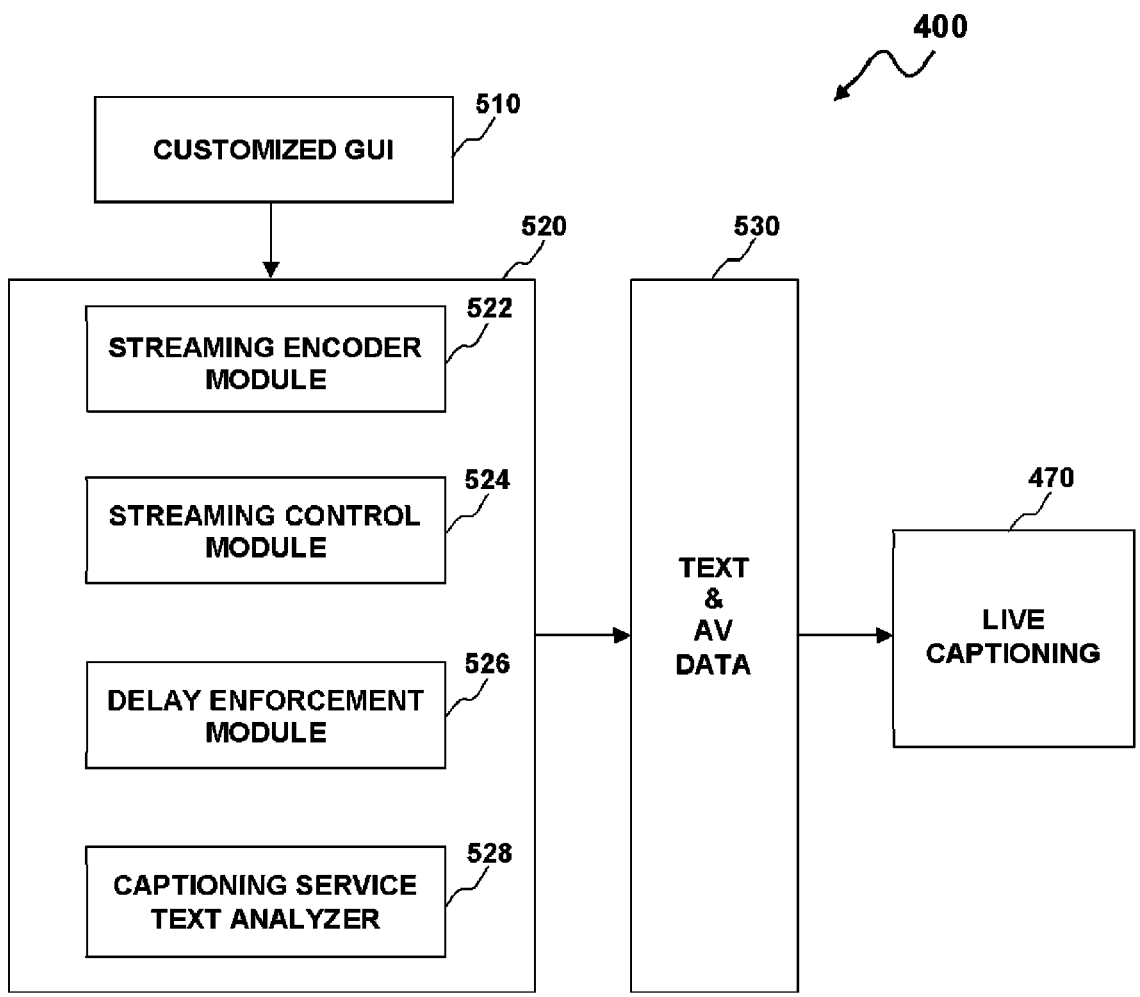
FIG. 5 illustrates an exemplary block diagram showing a group of modules and a customized GUI of the synchronized captioning system which can be implemented, in accordance with a preferred embodiment.

The interface 153, may be provided as a customized graphical user interface (CGUI) 510, as illustrated in FIG. 5, and can serve to display results, whereupon the user may supply additional inputs or terminate the session. In one possible embodiment, operating system 151 and interface 153 can be implemented in the context of a "Windows" system. Application module 152, on the other hand, can include instructions, such as the various operations described herein with respect to the various components and modules described herein, such as, for example, the method 700 depicted in FIG. 7.

FIG. 3 depicts a graphical representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing apparatus 100. Network 102 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers, which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). FIG. 1 is intended as an example, and not as an architectural limitation for different embodiments of the present invention.

The following description is presented with respect to embodiments of the present invention, which can be embodied in the context of a data-processing system such as data-processing apparatus 100, computer software system 150 and data processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

FIG. 4 illustrates an exemplary block diagram of a synchronized captioning system 400 for streaming media, in accordance with a preferred embodiment. As shown in FIG. 4, a text streaming service 410 can be a back-end process, which transcribes an AV (audio and/or video) data 420 into a textual data 430. The captioning system 400 can utilize the text streaming services 410 such as, for example, a "caption first" web service, and/or a text streaming web service, or leverage any other text streaming services 410, and capture the text from a hosting site 418 to deliver live AV/text streaming.

A caption writer 412 refers to a person, such as a stenographer, who transcribes data from a source presentation or an event. The data can be a "live" event, such as a sporting event, an academic presentation, or a financial news report. The data can be AV data 420 that is transcribed into a transcribed data 414 and then to the textual data 430. The caption writer 412 can also transcribe the data remotely, i.e. without physical presence of the caption writer 412 to perform the transcription. At the same time, the writer 412 can remotely listen to and/or watch the event using a telephone and/or a monitor or television set. A serial input device (not shown) can be connected to a computer encoder 416 that utilizes a direct socket connection to the hosting site 418, which turns around and spits the textual data 430 out onto the webpage. The captioning system 400 can provide the capability to merge the textual data 430 instantaneously with both audio and video data 420 utilizing a buffer 440, and inject the obtained code into an encoder 450. Then, the encoder 450 can stream the AV data 420, and synchronize the textual data 430 and the AV data 420 for achieving live captioning 470. The live captioning 470 can be served from windows media servers 460 by creating an advanced stream redirector (ASX) file that includes captions and audio/video nested in it.

FIG. 5 illustrates an exemplary block diagram showing a group of modules 520 and a customized GUI 510 of the synchronized captioning system 400 which can be implemented, in accordance with a preferred embodiment. A streaming encoder module (SEM) 522 comprises an encoding technique that enables code injection to synchronize text/data for live captioning 470. The streaming encoder module 522 can utilize the ASX file to call and merge on the windows media servers 460. A streaming control module (SCM) 524 can enable admin to set the number of words to be released from AV/text streaming at once for example, five words at a time.

In addition, the SCM 524 also allows admin to customize text format such as for example, font, text, color or type, to be delivered in streaming with the help of customized graphical user interface (GUI) 510. The SCM 524 can configure time interval and preset time setting to trigger SEM 522 in order to perform caption service binding and encoding. The SCM 524 can calculate preparation time and apply contingency so that the captioning system 400 can be kicked off via the event schedule and ensure prompt delivery of live streaming. The SCM 524 can also embed control data in streaming, and externally produce control data output.

A delay enforcement module 526 can incorporate adjustable text/audio/video speed and a default delay of two seconds. The delay enforcement module 526 prevents race condition to ensure the proper synchronization of the AV data 420 and the textual data 430. The delay enforcement module 526 can allow delay settings by marrying streaming with delay so all data involved are matched to allow end user to receive AV/text at the proper speed. Such speed can be calculated by measuring/analyzing the fast and slow speed then taking the average. A captioning service text analyzer 528 allows admin to configure pattern or delimiter to separate words for display. The captioning service text analyzer 528 can compare different captioning services that are produced as inputs, and highlight the difference in the captioning services to alert/prompt admin for automatic selection based on consistency across multiple providers. The captioning service text analyzer 528 can intelligently determine the ending words to be included in the display and embed all controls within streaming for easy update or applied externally using known technologies such as for example, code injection leveraging XML, JavaScript, and other web technologies.

Note that the term "GUI" as utilized herein generally refers to a type of environment that represents programs, files, options and so forth by means of graphically displayed icons, menus, and dialog boxes on a computer monitor screen. A user can interact with the customized GUI (CGUI) 510 to select and activate such options by pointing and clicking with a user input device such as, for example, a pointing device such as mouse, and/or a keyboard. The captioning system 400 can be setup to run as a service where admin of the streaming event specifies the desired control settings and schedule of the event by registering to utilize the CGUI 510 in online. The CGUI 510 can facilitate profile building for each provider and customer to allow customized live streaming solution independent of how provider method and technique of display text. The CGUI 510 controls administration and streaming management by offering encoding option, caption source location, delay control, slide control, and other visibility and text format injection options. The modules 522, 524, 526, 528 can be implemented with respect to the textual and/or AV data 530 to establish live captioning 470 based on the control settings and the encoding parameters assigned in the CGUI 510.

Figure 6:
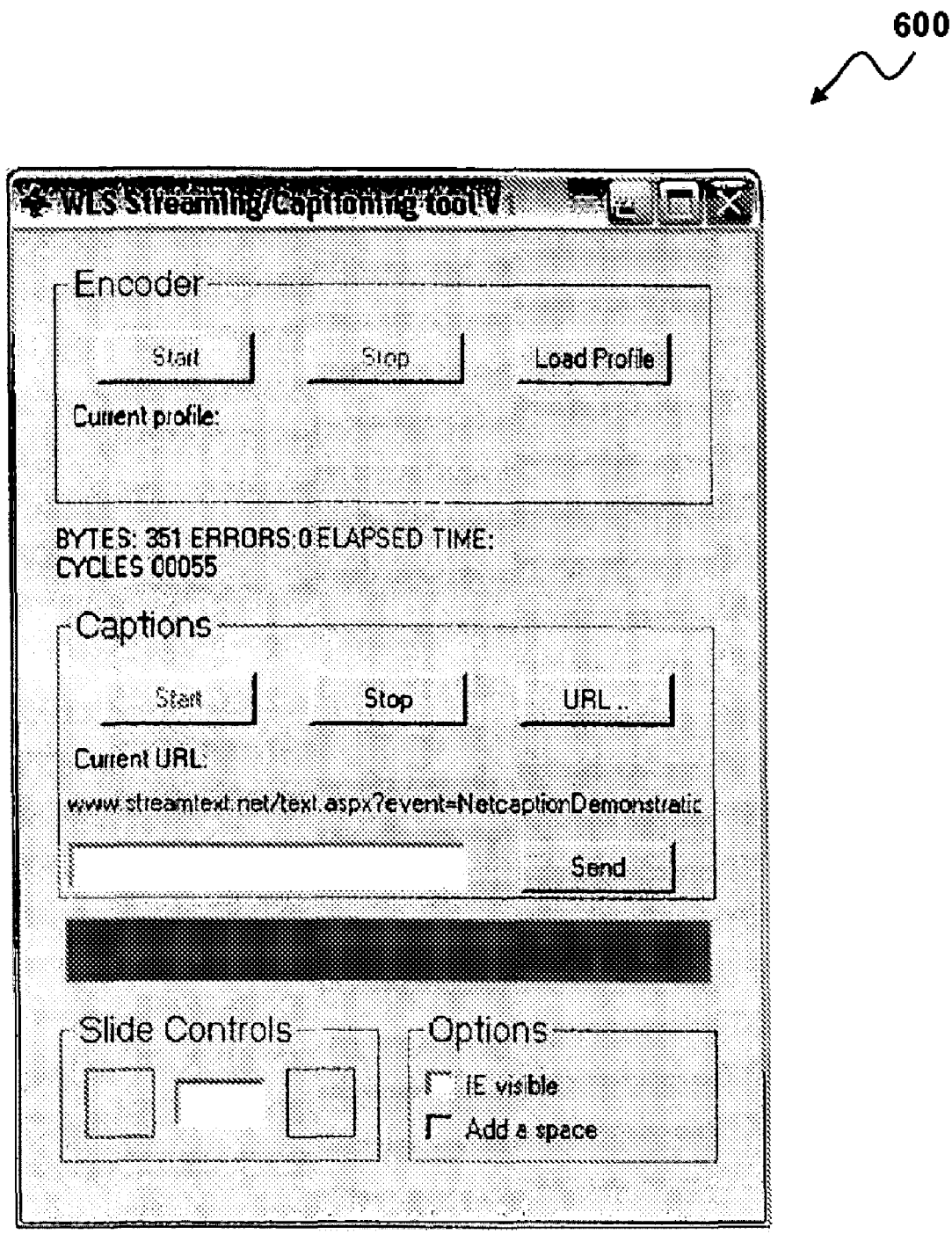
FIG. 6 illustrates a sample GUI which can be implemented, in accordance with a preferred embodiment.

FIG. 6 illustrates a sample GUI 600 which can be implemented, in accordance with a preferred embodiment. As shown in FIG. 6, the sample GUI 600 comprises several options and a uniform resource locator (URL) box, where the URL of the captioning service can be entered. The data can be embedded into internal script for streaming, while applying a command to place the URL of the caption services webcast into our script and by applying delay settings. The encoding process and other preparation necessary can be kicked off based on the control settings and the event schedule indicated in the sample GUI 600.

Figure 7:
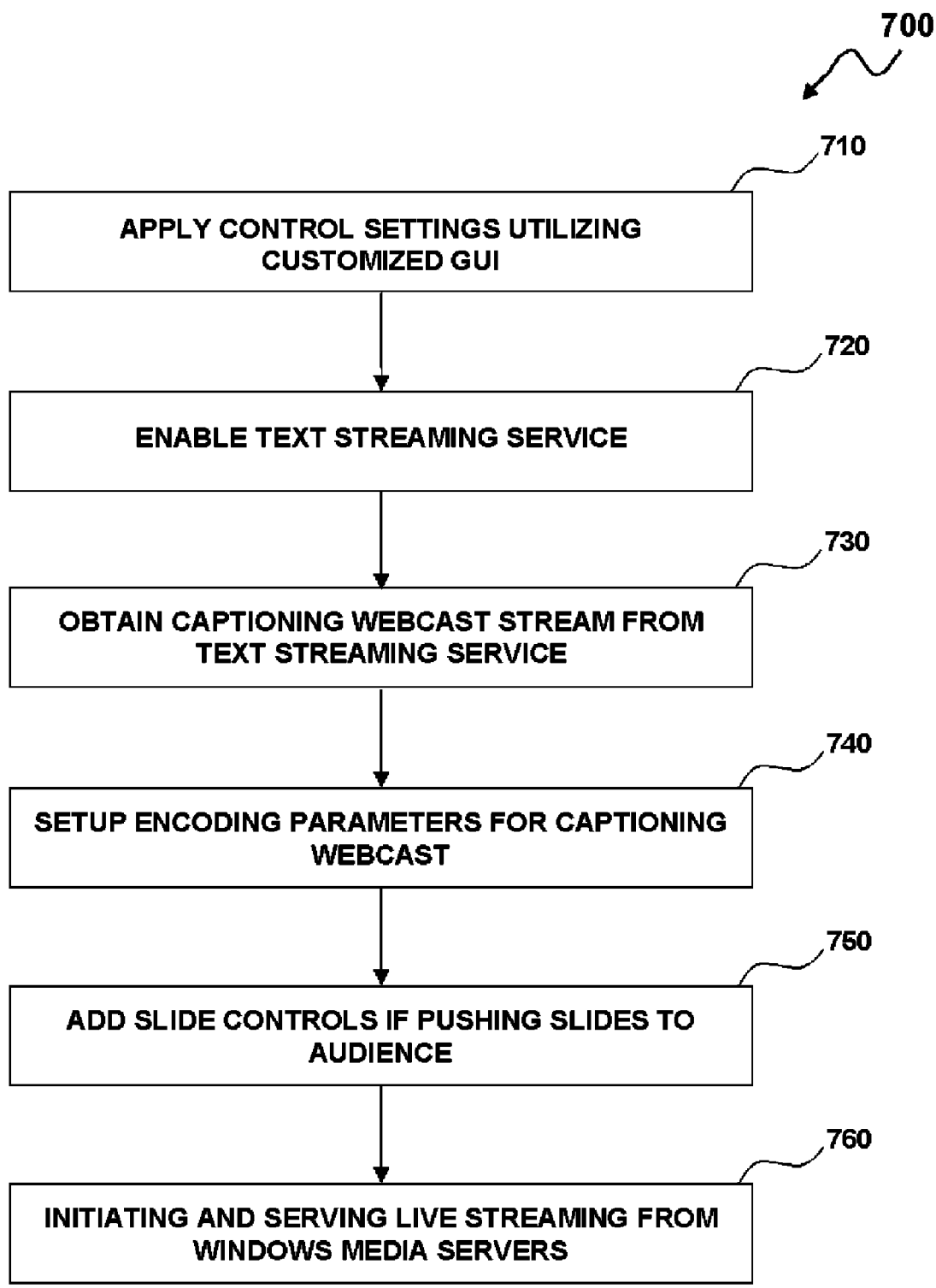
FIG. 7 illustrates a high level flow chart of operations illustrating logical operational steps of a method for providing dynamic and synchronized captioning service for streaming media, in accordance with a preferred embodiment.

FIG. 7 illustrates a flow chart of operations depicting a method 700 for providing dynamic and synchronized captioning service for streaming media, in accordance with a preferred embodiment. Note that the method 700 can be implemented in the context of a computer-useable medium that contains a program product. The method 700 depicted in FIG. 7 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 700 described herein can be deployed as process software in the context of a computer system or data-processing system as that depicted in FIGS. 1-3.

Note that, as illustrated in FIG. 7, control settings for the text and/or audio stream can be applied utilizing the customized GUI 510, as depicted at block 710. Note that in FIGS. 1-7 identical or similar parts or elements are generally indicated by identical reference numerals. The text streaming service 410 transcribing the AV data 420 into the textual data 430 can be enabled, as depicted at block 720. A captioning webcast stream can be obtained from the text streaming service 410, as depicted at block 730. Next, as illustrated at block 740, the encoding parameters can be defined for the captioning webcast stream. The audio and/or video can be referred as the webcast stream.

The audio and/or video can be a signal from a telephone via a phone-to-audio conversion tool, such as, for example, polycom, or a typical getner device. The video can be configured from, for example, either an IEEE 1394 Firewire or S-video components, or from a composite-type video cable. Thereafter, as depicted at block 750, slide controls can be added if pushing slides to the audience. The slides can exist as, for example, JPEG files on a server and be cached to the local user's system when the webcast begins, which may exhibit a slight delay. Finally, the live media streaming can be initiated and served from the windows media servers 460, as depicted at block 760. The process of live media streaming comprises an ASX file and a slides change script, where the ASX file can include the captions and the audio/video nested in it.

It is believed that by utilizing the system and approach described herein, video/audio and text streaming can be performed simultaneously at the same time interval. The system described herein also can be adapted for facilitating profile building for each provider and customer to allow customized live streaming solution independent of provider methods and techniques for displaying text.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implementable method for providing captioning of streaming media:

simultaneously marrying textual data with multimedia data in a preset time interval in order to form a captioned multimedia data stream, wherein said textual data and said multimedia data are dynamically synchronized with respect to one another and said captioned multimedia data stream;

permitting an end-user to modify, administer and control said captioned multimedia data stream and thereby provide effective live capture and delivery of said captioned multimedia data stream by:

providing a captioning service text analyzer that enables an administrator to configure a pattern associated with said textual data and separates a plurality of words from said textual data for a display thereof, wherein said captioning service test analyzer intelligently determines an end word from among said plurality of words in said display;

providing a delay enhancement tool that permits said user to adjust a speed of said textual data and/or said multimedia data with respect to said captioned multimedia data stream, which enables said end-user to receive, said textual data and/or said multimedia data at a proper speed thereof; and providing a customized graphical user interface for the control, administration and management of said captioned multimedia data stream based on at least one encoding option, at least one caption option, at least one delay control option, and at least one slide option in order to properly synchronize and deliver said textual data and said multimedia data for live streaming for said end-user via said captioned multimedia data stream.

2. The computer-implementable method of claim 1 wherein permitting said end-user to modify, administer and control said captioned multimedia data stream further comprises:

permitting said end-user to specify a font format with respect to said textual data embedded into said captioned multimedia data stream.

3. The computer-implementable method of claim 1 wherein permitting said end-user to modify, administer and control said captioned multimedia data stream further comprises:

permitting said end-user to specify control data utilized to embed said textual data into said captioned multimedia data stream.

4. A dynamic and synchronized captioning system, comprising:
- a processor;
- a data bus coupled to said processor; and
- a computer-usable medium embodying computer code, said computer-usable medium being coupled to said data bus, said computer program code comprising instructions executable by said processor and configured for:
- a streaming encoder module that provides a code injection for simultaneously marrying textual data and multimedia data in order to form a captioned multimedia data stream in a preset time interval;
- a streaming control module that configures and presets a time interval to trigger said streaming encoder module to perform a caption service binding and encoding operation with respect to said captioned multimedia data stream, and permits an end-user to specify a font format of said textual data and control data thereof utilized for embedding said font format into said captioned multimedia data stream;
- a delay enhancement tool for adjusting a speed of said textual data and/or said multimedia data, which enables said end-user to receive said textual data and/or said multimedia data via said captioned multimedia data stream at a desired speed;
- a captioning service text analyzer that enables an administrator to configure a pattern associated with said textual data and separates a plurality of words from said textual data for a display thereof, wherein said captioning service test analyzer intelligently determines an end word from among said plurality of words in said display; and
- a graphical user interface for controlling, administering and managing a streaming of said captioned multimedia data stream by providing at least one encoding option, at least one caption source location, at least one delay control, and at least one slide control with respect to said captioned multimedia data stream in order to thereby synchronize and delivery said textual data and said multimedia data in the context of said captioned multimedia data stream to said user.

5. The system of claim 4 further comprising an advanced stream redirector file associated with said streaming encoder module, wherein said advanced stream redirector is capable of calling and merging said textual data and said multimedia data on at least one media server.

6. The system of claim 4 wherein said delay enhancement tool calculates a speed of said textual data and/or said multimedia data by measuring and analyzing an average fast and slow speeds of said textual data and/or said multimedia data.

7. The system of claim 4 wherein said captioning service text analyzer compares a plurality of different sources to alert and/or prompt said administration for a selection of said plurality of words from said textual data for said display.

8. The system of claim 4 wherein said captioning text analyzer includes a plurality of tools for adding captions into said captioned multimedia data stream.

* * * * *